No. 835,658. PATENTED NOV. 13, 1906.
H. BARNETT.
EJECTOR.
APPLICATION FILED MAR. 8, 1906.

Witnesses
_____
C. H. Griesbauer.

Inventor
Henry Barnett
by H. B. Willson & Co.
Attorneys

UNITED STATES PATENT OFFICE.

HENRY BARNETT, OF LEMONT FURNACE, PENNSYLVANIA.

EJECTOR.

No. 835,658.     Specification of Letters Patent.     Patented Nov. 13, 1906.

Application filed March 8, 1906. Serial No. 304,938.

*To all whom it may concern:*

Be it known that I, HENRY BARNETT, a citizen of the United States, residing at Lemont Furnace, in the county of Fayette and State of Pennsylvania, have invented certain new and useful Improvements in Ejectors and Jet-Pumps; and I do declare the following to be a full, clear, and exact description of the invention, such as will enable others skilled in the art to which it appertains to make and use the same.

My invention is an improved ejector or jet-pump; and it consists of the construction, combination, and arrangement of devices hereinafter described and claimed.

Figure 1:
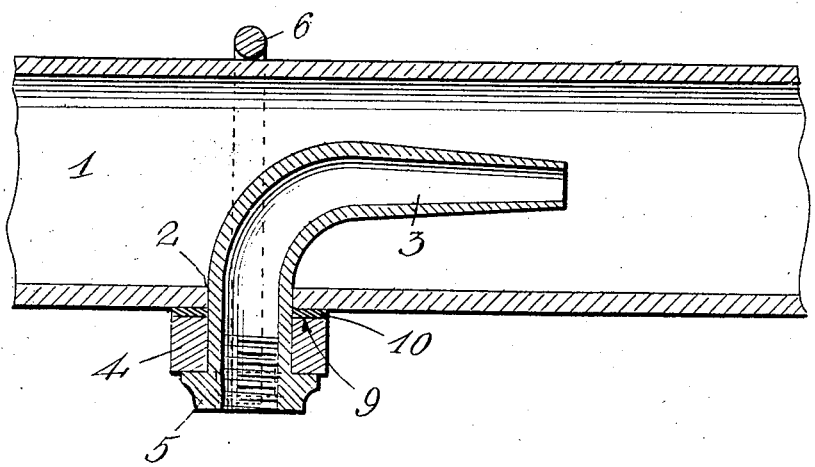
Figure 2:
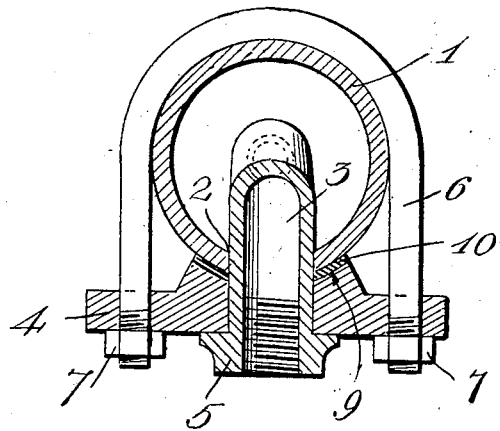

In the accompanying drawings, Figure 1 is a longitudinal sectional view of my improved ejector or jet-pump, and Fig. 2 is a transverse sectional view of the same.

The pipe through which the water is forced is indicated at 1. It is provided in one side with an opening 2 of suitable diameter, through which extends the elbow nozzle or jet 3, which is employed to discharge a jet of compressed air, steam, or other fluid into and through the pipe 1 to cause water or other liquid to be forced through said pipe. The said nozzle has that portion thereof which is without the pipe 1 extended through and permanently secured in an opening in a yoke 4 and is provided with a flange 5, which bears against the outer side of said yoke. The outer end of said nozzle, which is also the larger end thereof, is internally screw-threaded to enable the air or steam pipe to be connected thereto. The yoke 4 is clamped to the pipe 1 by means of a U-shaped bolt 6, which extends around the pipe and the arms of which extend through openings in the ends of the yoke and are provided with nuts 7 to clamp the yoke to the pipe. The inner side of the yoke is provided with a concaved seat 9, which is concentric with the opposite side of the pipe. A packing-washer 10, which is made of rubber or other suitable material, is placed on the said seat and has an opening through which the nozzle 3 extends, the function of the said packing-washer being to effect a tight joint between the yoke, the nozzle, and the pipe and prevent leakage of the latter.

From the foregoing description, taken in connection with the accompanying drawings, the construction and operation of the invention will be readily understood without a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

The herein-described ejector or jet-pump comprising the pipe having an opening in one side, the bent nozzle in said pipe and extending through said opening, the yoke having an opening through which the outer portion of said nozzle extends and having a seat for the opposite side of the pipe, said nozzle having the flange bearing against the outer side of the said yoke, and means to clamp the yoke to the pipe and thereby secure the nozzle in place.

In testimony whereof I have hereunto set my hand in presence of two subscribing witnesses.

HENRY BARNETT.

Witnesses:
   BRUCE F. STERLING,
   GEORGE PATTERSON.